United States Patent
Ludvig

(12) 
(10) Patent No.: US 6,667,023 B2
(45) Date of Patent: Dec. 23, 2003

(54) PREPARATION OF MFI TYPE CRYSTALLINE ZEOLITIC ALUMINOSILICATE

(75) Inventor: Maria M. Ludvig, Seabrook, TX (US)

(73) Assignee: Akzo Nobel N.V., Arnhem (NL)

(*) Notice: Subject to any disclaimer, the term of this patent is extended or adjusted under 35 U.S.C. 154(b) by 0 days.

(21) Appl. No.: 10/370,135

(22) Filed: Feb. 19, 2003

(65) Prior Publication Data

US 2003/0170172 A1 Sep. 11, 2003

Related U.S. Application Data

(60) Provisional application No. 60/360,661, filed on Mar. 1, 2002.

(51) Int. Cl.⁷ .............................................. C01B 39/38
(52) U.S. Cl. ................................ 423/709; 423/DIG. 21
(58) Field of Search .......................... 423/709, DIG. 22

(56) References Cited

U.S. PATENT DOCUMENTS

| | | | |
|---|---|---|---|
| 4,166,099 A | | 8/1979 | McDaniel et al. |
| 4,235,753 A | * | 11/1980 | Brown et al. ................. 502/68 |
| 4,606,900 A | | 8/1986 | Kacirek et al. |
| 5,330,736 A | | 7/1994 | Wu et al. ..................... 423/709 |
| 5,365,002 A | * | 11/1994 | Wallau et al. ............... 585/418 |
| 6,180,550 B1 | | 1/2001 | Beck et al. ................... 502/77 |

FOREIGN PATENT DOCUMENTS

| | | | |
|---|---|---|---|
| EP | 0129766 | 1/1985 | .......... G01N/29/02 |
| GB | 2166971 A | 5/1986 | ........ B01J/21/1229 |
| WO | 01/70629 A | 9/2001 | .......... C01B/39/00 |

OTHER PUBLICATIONS

Journal of the Chemical Society, vol. 10, 1990, pp. 755–756 "A Novel Method for the Preparation of Zeolite ZSM–5" W. Xu, et al.

Zeolites, 1986, vol. 6, May, pp. 225–227 "Determination of Framework Aluminium Content in Dealuminated Y–type Zeolites: A Comparison Based on Unit Cell Size and Wavenumber of I.R. bands", Sohn, et al.

"Clear Aqueous Nuclei Solution for Faujasite Synthesis", Ksasahara, et al, pp. 185–192 No Date Available.

International Search Report of International Patent Application No. PCT/EP03/01991, dated Jun. 27, 2003.

\* cited by examiner

Primary Examiner—David Sample
(74) Attorney, Agent, or Firm—Louis A. Morris

(57) ABSTRACT

A process for synthesizing a crystalline aluminosilicate zeolite having an MFI structure comprising crystallizing the zeolite from an alkaline aqueous reaction mixture that comprises $SiO_2$ and $Al_2O_3$ or their hydrated derivatives, and an amorphous aluminosilicate nucleating gel with an $SiO_2/Al_2O_3$ ratio of from about 10 to less than 20. The reaction mixture does not contain an organic template.

7 Claims, No Drawings

PREPARATION OF MFI TYPE CRYSTALLINE ZEOLITIC ALUMINOSILICATE

CROSS REFERENCE TO RELATED APPLICATIONS

This application claims priority from Provisional Patent Application No. 60/360,661, filed Mar. 1, 2002.

FIELD OF THE INVENTION

The present invention relates to a process for synthesizing a crystalline aluminosilicate zeolite having an MFI structure.

BACKGROUND INFORMATION

The aluminosilicates known as zeolites are highly complex chemical structures that present different crystalline structures as a function of their composition. Although they occur naturally, zeolites nowadays are mostly produced by industry aiming at various uses, the more important among which are application as adsorbents and as catalysts in the oil industry.

Among the various kinds of synthetic zeolites used in the oil industry, one frequently used is the zeolite of faujasite structure, which after its synthesis may show a molar composition according to the formula below:

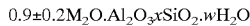

0.9±0.2M$_2$O.Al$_2$O$_3$.xSiO$_2$.wH$_2$O wherein M represents a cation of an alkaline metal, x is a number between 2.5 and 6, and w is a number between 6 and 9.

When preparing faujasite zeolites, the molar ratio between the oxides of aluminum and silicon is a further parameter that may be adjusted. As found in natural environments, the faujasite SiO$_2$/Al$_2$O$_3$ molar ratio is between 2.5 and 4. Synthetic zeolites of faujasite structure of higher SiO$_2$/Al$_2$O$_3$ molar ratio have been prepared, since it was found that structures with a higher silica content are more resistant to temperature and acids, situations which are usually encountered in the application of zeolites in the oil industry. A faujasite structure zeolite used mainly in industry, and especially in the oil industry, is the type Y zeolite, where the SiO$_2$/Al$_{2O3}$ molar ratio is higher than 4.5.

Zeolite ZSM-5 (also referred to as "MFI") is a unique class of alumino silicates with a crystal structural framework. ZSM-5 compositions, in a preferred synthesized form, have the formula:

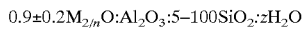

0.9±0.2M$_{2/n}$O:Al$_2$O$_3$:5–100SiO$_2$:zH$_2$O

M is selected from the group consisting of a mixture of alkali metal cations, especially sodium, and tetraalkylammonium cations, the alkyl groups of which preferably contain 2–5 carbon atoms.

The very high SiO$_2$/Al$_2$O$_3$ molar ratio of ZSM-5 as indicated in the above formula presents several drawbacks, since generally those zeolites are obtained through processes of extended periods of crystallization, which require huge crystallization vessels and a sharp control of the overall production process to avoid impurities, namely, different crystalline phases, which harm the end product.

Experts in the field of zeolite preparation who keep up with the technical literature of the field will be aware of the technique of zeolite crystallization described by X. Wenyang et al. in *Journal of Chemical Communication* Vol. 10, 1990, pp. 755, where ZSM-5 type zeolites of high SiO$_2$/Al$_2$O$_3$ molar ratio were obtained through the contact of a precursor gel with vaporized organic compounds. According to this process, the crystallization of the precursor gel (amorphous to X-rays) occurs through the transport of the organic compounds (amines) in the vapor phase. The process thus developed ensures that the synthesis of these kinds of zeolites, which normally is effected using the precursors as an aqueous suspension and in the presence of a template agent, normally a quaternary ammonium salt or amines, is rendered simpler and more economical.

The disadvantage of the use of organic templates is that they are expensive and that, as a result of decomposition of the organic template, environmentally harmful compounds are released upon heating of the so-prepared zeolites. Hence, preparation of ZSM-5 in the absence of organic template is desired.

However, seeding of the reaction mixture remains desired. The use of seeding material accelerates the crystallization process. If the same ratio of raw materials were used in an unseeded reaction, then the crystallinity of MFI material would be less than 40% in ten hours and typically would take greater than 48 hours to reach completion. Preferably, such seeding materials do not contain MFI-type zeolites, as this would make the process more expensive.

ZSM-5 zeolite, generally prepared by using an organic template agent, such as an ammonium quaternary salt, shows a much higher SiO$_2$/Al$_2$O$_3$ molar ratio than the molar ratios usually encountered for type Y zeolites.

U.S. Pat. No. 4,606,900 (Kacirek et al.) discloses a method of preparing crystalline ZSM-5 zeolite using an X-ray amorphous aluminosilicate nucleating gel in the silica-alumina reaction batch with an SiO$_2$ to AlO$_2$ molar ratio ±10. This is equivalent to a SiO$_2$ to Al$_2$O$_3$ molar ratio of ±20.

U.S. Pat. No. 4,166,099 (McDaniel et al.) discloses a method for preparing crystalline zeolites using amorphous aluminosilicate nucleation centers having an SiO$_2$ to Al$_2$O$_3$ molar ratio of 2.3 to 2.7.

Objectives of the present invention include the preparation of MFI-type zeolite in very high yield, but without the use of an organic template with its associated expense and environmental problems, or the use of seeds comprising crystalline material that tends to require more process steps.

SUMMARY OF THE INVENTION

Accordingly, in one embodiment, the present invention relates to a process for synthesizing a crystalline aluminosilicate zeolite having an MFI structure. The process comprises crystallizing the zeolite from an alkaline aqueous reaction mixture that comprises SiO$_2$ and Al$_2$O$_3$ or their hydrated derivatives, and an amorphous aluminosilicate nucleating gel with an SiO$_2$/Al$_2$O$_3$ ratio of from about 10 to less than 20. The reaction mixture does not contain an organic template.

It has been found that the yield of zeolite having MFI structure (e.g. ZSM-5) depends on the SiO$_2$/Al$_2$O$_3$ ratio of the amorphous aluminosilicate nucleating gel. When this ratio ranges from 10 to less than 20, higher MFI-yields are obtained then with higher or lower SiO$_2$/Al$_2$O$_3$ ratios.

Other embodiments of the invention relate to compositions of reaction mixtures, reaction conditions and optimum SiO$_2$/Al$_2$O$_3$ ratios in the nucleating seeds, each of which will be described in detail hereinbelow.

DETAILED DESCRIPTION OF THE INVENTION

Broadly speaking, the present invention as described and claimed in the present application relates to a process for preparing MFI-type zeolites such as ZSM-5, as detailed hereinbelow, in very high yield.

The preparation of zeolite having an MFI-type structure starts with the preparation of the reaction mixture comprising sources of silica and alumina and the seeds that comprise an amorphous aluminosilicate nucleating gel. The silica-alumina source can be obtained in several ways, by widely varying the silica-alumina ratio. For example, a silica-alumina can be obtained from the co-precipitation of a source of silica, such as sodium silicate, with a source of alumina, such as aluminum sulfate or sodium aluminate, as taught in GB 2166971, yielding a silica-alumina of $SiO_2/Al_2O_3$ (SAR) between 1 and 15 and containing of from 10 to 90 weight % $SiO_2$, or according to EP 0129766, which shows a silica-alumina ratio of 10.

Suitable alumina sources are aluminum salts such as aluminum sulfate, sodium aluminate, aluminum nitrate, aluminum chlorohydrate, aluminum trihydrate such as gibbsite, BOC, and bayerite, calcined forms of aluminum trihydrate including flash calcined gibbsite. Also mixtures of the above-mentioned alumina sources may be used. If aluminum trihydrate or its thermally treated forms are used, it is preferred to age the silica source and alumina source in a slurry at a temperature below 100° C. to obtain the precursor gel. Suitable silica sources include sodium silicate and silica sol, for instance ammonium stabilized silica sol.

If desired, organic or inorganic acids and bases may be added, for example, to maintain the desired pH of the reaction mixture.

The amorphous aluminosilicate nucleating gel or seeds can be prepared according to several recipes to be found in the literature. Kasahara et al. in "Studies of Surface Science and Catalysis," *Proceedings of the 7th International Conference on Zeolites* 1986, pp. 185–192, teach the preparation of a seed having the following molar composition:

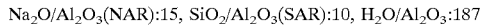

$Na_2O/Al_2O_3(NAR):15$, $SiO_2/Al_2O_3(SAR):10$, $H_2O/Al_2O_3:187$

One skilled in the art can make these seeds using waterglass, sodium aluminate and caustic in the correct proportions to yield an active seed mixture. The seed mixture is typically aged for one to two weeks before use and can last for a long time. A typical preparation is to mix the required waterglass and caustic in a vessel and then to add with the proper agitation a diluted sodium aluminate solution. The seeds are aged at below 30° C. for at least 150 hours before use.

Such recipes lead to the preparation of seeds showing successful results for the preparation of MFI-type zeolite as described in the present application.

According to another embodiment of the present invention, the MFI-type zeolite precursor gel is prepared by mixing the source of silica-alumina or the sources of silica and alumina and the seed at ambient temperature.

The amount of seed required for the crystallization of the MFI-type zeolite is between about 0.2 and about 12 weight %, more preferably between about 1 and about 5 weight %.

Zeolites typically are found in the alkali form after synthesis and need to be converted over to the hydrogen form by known ion exchange techniques with ammonium salts. Calcination of the ammonium form results in producing the hydrogen form of the zeolite. Other metals can also be substituted for the ammonium, such as rare earths, zinc, calcium and iron.

After the above processing, it could be useful to incorporate the zeolite with a matrix made of materials that will be resistant to temperature and other conditions used in the process. The matrix materials act as binders and gives strength to the particle to withstand severe temperatures, pressure and any fluidization conditions that are normally encountered in many cracking processes. Useful matrix components include synthetic and naturally occurring materials, such as clay, silica and/or other metal oxides.

The drying step may optionally be combined with a shaping step. Suitable shaping steps include spray-drying, pelletizing, extrusion (optionally combined with kneading), beading, or any other conventional shaping method used in the chemical or petroleum industry. The amount of liquid present in the precursor gel used in the shaping step should be adapted to the specific shaping step to be conducted. In other words, the degree of drying prior to the shaping step must be adjusted. It may even be necessary to add additional or other liquid and/or to change the pH to make the precursor gel suitable for shaping.

Also for spray-drying it is crucial that the solids content is properly adjusted. Some shaping methods, such as spray-drying, inherently include drying of the shaped bodies. Other shaping methods need additional drying of the shaped bodies.

Various additives which are commonly used in the various shaping methods, such as pelletizing aids and extrusion aids, may be added to the precursor gel. If the precursor gel is dried without any shaping step, it is obtained as a powder. These pre-shaped bodies or powders are subsequently subjected to the treatment with steam, which will be described hereinbelow.

The MFI-type zeolite and the pre-shaped bodies prepared as described and claimed herein were characterized with the aid of several commonly employed physico-chemical techniques well-known to the experts, such as:

X ray diffraction (XRD):

one of the most widely employed techniques for characterizing zeolites. The instrument used was a Siemens D-5000TT, with Cu Kα radiation and a solid-state detector. For the MFI-type zeolite samples (without any other crystalline phase such as kaolin) all the 2θ peaks between 20–25° two theta were considered and integrated for calculating the crystalline percentage of the MFI-type zeolite. An MFI-type zeolite prepared according to well-known techniques was taken as 105.7% crystallinity standard.

For kaolin-containing samples, as in the case of the microspheres, the sum of the peak areas which correspond to the 7.2 through 9.3 two theta reflections was compared to the sum of the areas of the same peaks for the MFI-type zeolite catalyst standard, the interference of the kaolin peaks being eliminated.

elemental analyses:

sodium, aluminum, and silicon were analyzed with the aid of X-ray fluorescence (XRF), the obtained values being reported as oxides.

silica-alumina ratio (SAR):

depending on the sample tested, the value of this parameter can be obtained by two methods. For samples, which were washed to eliminate the unreacted silica, elemental analysis through X-ray fluorescence (XRF) was used.

For unwashed samples, the silica-alumina ratio was obtained with the aid of infrared spectroscopy ($SAR_{IV}$).

$SAR_{IV}$ is obtained from the analysis of the wave number (λ) of the peak corresponding to the vibration of symmetrical stretching of the O-T-O link (where O are oxygen atoms and T are Si or Al atoms). This number is in correlation with the number of Al atoms by unit cell of the crystalline network and is observed in the area of vibration of the crystalline block between 1400 and 400 cm$^{-1}$, according to J. R. Sohn et al. in Zeolites 6, pp. 255–57, 1986.

surface area:
this was assessed through the BET method (Brunauer, Emmett, and Teller), a widely known and applied method for determining surface areas in porous materials. The method is based on analysis of the nitrogen adsorption isotherms at the temperature of liquid nitrogen. The volume of micropores is also obtained from the adsorption isotherm, based on the "t-plot" method (of Harkins & Jura) in the range of 3.3 to 5.4 Angstroms. In spite of some discussion still remaining on the validity of using this method for microporous solids such as zeolites, such a method is widely employed and the obtained values are normally accepted by the experts in the field.

scanning electron microscopy (SEM):
this is a technique used for analyzing the morphology and composition of the catalyst surface. Samples were mounted on a double-sided adhesive carbon tape followed by a layer of electrical conducting material (Au—Pd).

average diameter of the catalyst microspheres:
this parameter corresponds to the diameter, expressed in microns, below which there are 50% of the catalyst particles. It is assessed through the light scattering laser technique from an aqueous suspension of a catalyst sample.

evaluation of the catalytic activity of the catalyst microspheres:
in the field of fluid catalytic cracking, the evaluation of the zeolite catalyst performance is usually effected on a laboratory scale with the aid of the microactivity test—MAT—in accordance with the ATM D-3907-80 Method, as adapted to heavy feeds. The MAT test comprises a fixed bed reactor containing the catalyst sample to be tested, into which a known amount of gas oil is injected. Different catalyst/oil ratios are tested in order to obtain yield curves, which allow the quantification of products for the same conversion level. The temperature of the MAT test was altered from 482° C. to 520° C. in order to allow the flow of a heavier feed. The conversion, accepted as the catalyst activity, is defined as the weight percentage of the feed converted into coke, gas, and gasoline. As the light cycle oil (LCO) fraction is not considered a product, the conversion is expressed as [100-(LCO+Residuum)].

The alkaline aqueous reaction mixture may be aged from about 0 hours to about 24 hours at a temperature from about ambient to about 120° C.

Following aging, if aging occurs, the MFI-type zeolite is crystallized from the alkaline aqueous reaction mixture. The reaction conditions for crystallization include a temperature of from about 100° C. to about 200° C. and reaction time from about 5 hours to about 24 hours. The pH of the alkaline aqueous reaction mixture may range from about 9 to about 13.

The weight percent seeds, based on the amount of SiO$_2$ in the reaction mixture may range from about 0.2 to about 12.

The SiO$_2$/Al$_2$O$_3$ molar ratio in the reaction mixture will most preferably range from about 30 to about 100.

The use of seeding material accelerates the crystallization process. If the same ratio of raw materials were used in an unseeded reaction, then the process would not be complete in 10 hours. The crystallinity of MFI material would be less than 40% in ten hours and typically would take greater than 48 hours to reach completion. Other seed materials are known for this process but they contain organic template or the use of MFI itself for a self-seeding process. This process is a new method to make MFI without the use of the expensive organic template or MFI itself.

The present invention will now be illustrated by the following examples, which should not be construed as limiting the same.

EXAMPLES

Comparative Example A

This example illustrates the use of amorphous aluminosilicate nucleating seeds having an SAR of 9 to make MFI-type (ZSM-5) zeolite.

A 1 kg. mixture of water, 2.4 wt % of Al$_2$O$_3$, 85.3 wt % of SiO$_2$ and 12.3 wt % of Na$_2$O was prepared (wt % based on dry solids). To that mixture was added 3 wt. % (based on SiO$_2$) of aluminosilicate nucleating gel having an SAR of 9. The mixture became gritty and clumpy and was thinned by the addition of an additional 225 g. of water. The mixture was mixed for 5 minutes and transferred to an autoclave having a mixer running at 250 rpm. The mixture was autoclaved for 5 min. at 25° C., 1 hr. at 99° C., 10 hrs. at 170° C. and cooled to 25° C. in 75 minutes. The mixture was dewatered to obtain the slurried solids, hot water washed and dried at 110° C.

Table 1 summarizes the results:

TABLE 1

| Wt % seeds (based on SiO$_2$) | 3 |
|---|---|
| Desired SAR | 58.8 |
| Actual SAR | 30.4 |
| Wt % Al$_2$O$_3$ | 5.10 |
| Wt % SiO$_2$ | 91.19 |
| Wt % Na$_2$O | 3.05 |
| % crystalline ZSM-5 | 46.0 |
| BET SA (m$^2$/g) | 296 |
| V micro (ml/g) | 0.0714 |
| NPSA | 13.21 |

The difference between desired and actual SAR is due to the fact that there is always excess silica in the system for crystallization. If it were all crystallized the desired SAR would be obtained. The actual SAR reflects the amount of silica that is actually used. Higher yields will result in the desired and actual SAR values being closer to each other. Higher yields are possible by changing the pH. The XRD crystallinity value reflects the amount of crystalline material present. The higher the number the more crystalline material, with less amorphous unreacted materials, is present in the solid material. The crystallinity typically increases with time during a crystallization process. These reactions ere run for 10 hours, so a low value infers that the process is not complete and a higher value would be obtained with more time. A value above 90% reflects well-crystallized material.

Comparative Example B

This example illustrates the use of amorphous aluminosilicate nucleating seeds having an SAR of ∞(no Al$_2$O$_3$)to make MFI-type (ZSM-5) zeolite.

A 1 kg. mixture of water, 2.7 wt % of Al$_2$O$_3$, 92.0 wt % of SiO$_2$ and 5.3 wt % of Na$_2$O was prepared (wt % based of dry solids). To that mixture was added 1wt. % (based on SiO$_2$) of aluminosilicate nucleating seeds having an SAR of ∞. The mixture was mixed for 5 minutes and transferred to an autoclave having a mixer running at 250 rpm. The mixture was autoclaved for 5 min. at 25° C., 1 hr. at 99° C., 8 hrs. at 170° C. and cooled to 25° C. in 75 minutes. The mixture was dewatered to obtain the slurried solids, hot water washed and dried at 110° C.

Table 2 summarizes the results.

TABLE 2

| Wt % seeds (based on SiO$_2$) | 1 |
|---|---|
| Desired SAR | 58.8 |
| Actual SAR | 38.4 |
| Wt % Al$_2$O$_3$ | 4.07 |
| Wt % SiO$_2$ | 92.01 |
| Wt % Na$_2$O | 3.16 |
| % crystalline ZSM-5 | 12.5 |
| BET SA (m$^2$/g) | 85 |
| V micro (ml/g) | 0.0163 |
| NPSA | 3.06 |

Comparative Example C

This example illustrates the use of amorphous aluminosilicate nucleating seeds having an SAR of 23 to make MFI-type (ZSM-5) zeolite.

A 1 kg. mixture of water, 2.4 wt % of Al$_2$O$_3$, 85.2 wt % of SiO$_2$ and 12.4 wt % of Na$_2$O was prepared (wt % based of dry solids). To that mixture was added 3 wt. % (based on SiO$_2$) of aluminosilicate nucleating seeds having an SAR of 23. The mixture became gritty and clumpy and was thinned by the addition of an additional 175 g of water. The mixture was mixed for 5 minutes and transferred to an autoclave having a mixer running at 250 rpm. The mixture was autoclaved for 5 min. at 25° C., 1 hr. at 99° C., 10 hrs. at 170° C. and cooled to 25° C. in 75 minutes. The mixture was dewatered to obtain the slurried solids, hot water washed and dried at 110° C.

Table 3 summarizes the results.

TABLE 3

| Wt % seeds (based on SiO$_2$) | 3 |
|---|---|
| Desired SAR | 58.8 |
| Actual SAR | 33.43 |
| Wt % Al$_2$O$_3$ | 4.72 |
| Wt % SiO$_2$ | 92.81 |
| Wt % Na$_2$O | 2.47 |
| % ZSM-5 | 69.4 |
| BET SA (m$^2$/g) | 326 |
| V micro (ml/g) | 0.1038 |
| NPSA | 13.78 |

Example 1

This example illustrates the use of amorphous aluminosilicate nucleating seeds which in accordance with the present invention have an SAR between 10 and 20, in this case 16.49, to make MFI-type (ZSM-5) zeolite.

A 1 kg. mixture of water, 2.3 wt % of Al$_2$O$_3$, 79.1 wt % of SiO$_2$ and 18.6 wt % of Na$_2$O was prepared (wt % based of dry solids). To that mixture was added 3 wt. % (based on SiO$_2$) of aluminosilicate nucleating seeds having an SAR of 16.56. The mixture became gritty and clumpy and was thinned by the addition of an additional 225 g of water. The mixture was mixed for 5 minutes and transferred to an autoclave having a mixer running at 250 rpm. The mixture was autoclaved for 5 min. at 25° C., 1 hr. at 99° C., 8 hrs. at 170° C. and cooled to 25° C. in 75 minutes. The mixture was dewatered to obtain the slurried solids, hot water washed and dried at 110° C.

Table 4 summarizes the results.

TABLE 4

| Wt % seeds (based on SiO$_2$) | 3 |
|---|---|
| Desired SAR | 58.8 |
| Actual SAR | 34.94 |
| Wt % Al$_2$O$_3$ | 4.35 |
| Wt % SiO$_2$ | 89.40 |
| Wt % Na$_2$O | 3.04 |
| % crystalline ZSM-5 | 93.6 |
| BET SA (m$^2$/g) | 286 |
| V micro (ml/g) | 0.1122 |
| NPSA | 12 |

Example 2

This example illustrates the use of amorphous aluminosilicate nucleating seeds having an SAR ratio of 16.56 and aged for 19 days, to make MFI-type (ZSM-5) zeolite.

A 1 kg. mixture of water, 2.4 wt % of Al$_2$O$_3$, 85.2 wt % of SiO$_2$ and 12.4 wt % of Na$_2$O was prepared (wt % based of dry solids). To that mixture was added 3 wt. % (based on SiO$_2$) of aluminosilicate nucleating seeds having an SAR of 16.56. The mixture was mixed for 5 minutes and transferred to an autoclave having a mixer running at 250 rpm. The mixture was autoclaved for 2 min. at 25° C., 10 hrs. at 170° C. and cooled to 25° C. in 75 minutes. The mixture was dewatered to obtain the slurried solids, hot water washed and dried at 110° C.

Table 5 summarizes the results.

TABLE 5

| Wt % seeds (based on SiO$_2$) | 3 |
|---|---|
| Desired SAR | 58.8 |
| Actual SAR | 34.5 |
| Wt % Al$_2$O$_3$ | 4.54 |
| Wt % SiO$_2$ | 92.12 |
| Wt % Na$_2$O | 3.42 |
| % crystalline ZSM-5 | 97.2 |
| BET SA (m$^2$/g) | 259 |
| V micro (ml/g) | 0.1600 |
| NPSA | 6 |

Example 3

This example illustrates the use of amorphous aluminosilicate nucleating seeds having an SAR ratio of 16.49 and aged for 47 days, to make MFI-type (ZSM-5) zeolite.

A 1 kg. mixture of water, 2.9 wt % of Al$_2$O$_3$, 85.6 wt % of SiO$_2$ and 11.5 wt % of Na$_2$O was prepared (wt % based of dry solids). To that mixture was added 3 wt % (based on SiO$_2$) of aluminosilicate nucleating seeds having an SAR of 16.49. The mixture was mixed for 5 minutes and transferred to an autoclave having a mixer running at 250 rpm. The mixture was autoclaved for 2 min. at 25° C., 2 hr. at 99° C., 10 hrs. at 170° C. and cooled to 25° C. in 75 minutes. The mixture was dewatered to obtain the slurried solids, hot water washed and dried at 110° C.

Table 6 summarizes the results.

TABLE 6

| Wt % seeds (based on $SiO_2$) | 3 |
|---|---|
| Desired SAR | 58.8 |
| Actual SAR | 36.1 |
| Wt % $Al_2O_3$ | 4.38 |
| Wt % $SiO_2$ | 93.05 |
| Wt % $Na_2O$ | 2.68 |
| % crystalline ZSM-5 | 95.8 |
| BET SA ($m^2/g$) | 317 |
| V micro (ml/g) | 0.1228 |
| NPSA | 11.5 |

Example 4

This example illustrates the use of amorphous aluminosilicate nucleating seeds having an SAR ratio of 16.49 and aged for 82 days, to make MFI-type (ZSM-5) zeolite.

A 1 kg. mixture of water, 2.4 wt % of $Al_2O_3$, 85.3 wt % of $SiO_2$ and 12.3 wt % of $Na_2O$ was prepared (wt % based of dry solids). To that mixture was added 1 wt % (based on $SiO_2$) of aluminosilicate nucleating seeds having an SAR of 16.49. The mixture was mixed for 5 minutes and transferred to an autoclave having a mixer running at 250 rpm. The mixture was autoclaved for 2 min. at 25° C., 10 hrs. at 170° C. and cooled to 25° C. in 75 minutes. The mixture was dewatered to obtain the slurried solids, hot water washed and dried at 110° C.

Table 7 summarizes the results.

TABLE 7

| Wt % seeds (based on $SiO_2$) | 1 |
|---|---|
| Desired SAR | 58.8 |
| Actual SAR | 32.8 |
| Wt % $Al_2O_3$ | 4.69 |
| Wt % $SiO_2$ | 90.58 |
| Wt % $Na_2O$ | 4.72 |
| % ZSM-5 | 93.8 |
| BET SA ($m^2/g$) | 292 |
| V micro (ml/g) | 0.1268 |
| NPSA | 14.8 |

Example 5

This example illustrates the use of amorphous aluminosilicate nucleating seeds having an SAR ratio of 16.49 and aged for 84 days, to make MFI-type (ZSM-5) zeolite.

A 1 kg. mixture of water, 2.4 wt % of $Al_2O_3$, 85.3 wt % of $SiO_2$ and 12.3 wt % of $Na_2O$ was prepared (wt % based of dry solids). To that mixture was added 1 wt % (based on $SiO_2$) of aluminosilicate nucleating seeds having an SAR of 16.49. The mixture was mixed for 5 minutes and transferred to an autoclave having a mixer running at 250 rpm. The mixture was autoclaved for 2 min. at 25° C., 10 hrs. at 170° C. and cooled to 25° C. in 75 minutes. The mixture was dewatered to obtain the slurried solids, hot water washed and dried at 110° C.

Table 8 summarizes the results.

TABLE 8

| Wt % seeds (based on $SiO_2$) | 1 |
|---|---|
| Desired SAR | 58.8 |
| Actual SAR | 32.0 |
| Wt % $Al_2O_3$ | 4.90 |
| Wt % $SiO_2$ | 92.34 |
| Wt % $Na_2O$ | 2.76 |
| % ZSM-5 | 95.5 |
| BET SA ($m^2/g$) | 314 |
| V micro (ml/g) | 0.1217 |
| NPSA | 8.9 |

Example 6

This example illustrates the use of amorphous aluminosilicate nucleating seeds which in accordance with the present invention have an SAR between 10 and less than 20, in this case 12, to make MFI-type (ZSM-5) zeolite.

A 1 kg. mixture of water, 3.1 wt % of $Al_2O_3$, 95.1 wt % of $SiO_2$ and 1.8 wt % of $Na_2O$ was prepared (wt % based of dry solids). To that mixture was added 3 wt. % (based on $SiO_2$) of aluminosilicate nucleating seeds having an SAR of 12. The mixture became gritty and clumpy and was thinned by the addition of an additional 110 g. of water. The mixture was mixed for 5 minutes and transferred to an autoclave having a mixer running at 250 rpm. The mixture was autoclaved for 5 min. at 25° C., 1 hr. at 99° C., 10 hrs. at 170° C. and cooled to 25° C. in 75 minutes. The mixture was dewatered to obtain the slurried solids, ammonium chloride washed (to remove soda) followed by a hot water wash then dried at 110° C.

Table 9 summarizes the results.

TABLE 9

| Wt % seeds (based on $SiO_2$) | 3 |
|---|---|
| Desired SAR | 58.8 |
| Actual SAR | 26.7 |
| Wt % $Al_2O_3$ | 5.97 |
| Wt % $SiO_2$ | 93.76 |
| Wt % $Na_2O$ | 0.16 |
| % crystalline ZSM-5 | 91 |
| BET SA ($m^2/g$) | 357 |
| V micro (ml/g) | 0.1226 |
| NPSA | 6 |

Example 7

This example illustrates the use of amorphous aluminosilicate nucleating seeds which in accordance with the present invention have an SAR between 10 and less than 20, in this case 18, to make MFI-type (ZSM-5) zeolite.

A 1 kg. mixture of water, 3.0 wt % of $Al_2O_3$, 95.1 wt % of $SiO_2$ and 1.9 wt % of $Na_2O$ was prepared (wt % based of dry solids). To that mixture was added 3 wt. % (based on $SiO_2$) of aluminosilicate nucleating seeds having an SAR of 18. The mixture became gritty and clumpy and was thinned by the addition of an additional 144 g. of water. The mixture was mixed for 5 minutes and transferred to an autoclave having a mixer running at 250 rpm. The mixture was autoclaved in two ways (A) for 5 min. at 25° C., 1 hr. at 99° C., and 10 hrs. at 170° C., and (B) for 5 min. at 25° C., 1 hr. at 170° C. The autoclaved mixtures were cooled to 25° C. in 75 minutes. The mixture was dewatered to obtain the slurried solids, ammonium chloride washed (to remove soda) followed by a hot water wash then dried at 110° C.

Table 10 summarizes the results.

TABLE 10

| Wt % seeds (based On $SiO_2$) | 3 | 3 |
|---|---|---|
| Reaction hours | 10 | 24 |
| Desired SAR | 58.8 | 58.8 |
| Actual SAR | 32.67 | 33.66 |
| Wt % $Al_2O_3$ | 4.95 | 4.82 |
| Wt % $SiO_2$ | 95.13 | 95.39 |
| Wt % $Na_2O$ | 0.03 | 0.00 |
| % crystalline ZSM-5 | 50 | 90.7 |
| BET SA ($m^2/g$) | 310 | 344 |
| V micro (ml/g) | 0.0956 | 0.1201 |
| NPSA | 12 | 11 |

It is clear from the above examples and comparative examples that use of an amorphous aluminosilicate nucleating gel with an $SiO_2/Al_2O_3$ ratio of from 10 to less than 20 in the synthesis of crystalline aluminosilicate zeolite having an MFI structure (includes ZSM-5) results in a very surprisingly high yield of ZSM-5 as compared to use of amorphous aluminosilicate nucleating gels having $SiO_2/Al_2O_3$ ratios outside that range.

I claim:

1. A process for synthesizing a crystalline aluminosilicate zeolite having an MFI structure comprising crystallizing said zeolite from an alkaline aqueous reaction mixture that comprises $SiO_2$ and $Al_2O_3$ or their hydrated derivatives, and an amorphous aluminosilicate nucleating gel with an $SiO_2/Al_2O_3$ ratio of from about 10 to 19, said reaction mixture not containing an organic template.

2. The process of claim 1 wherein the $SiO_2/Al_2O_3$ molar ratio of said amorphous aluminosilicate nucleating gel is from about 12 to about 17.

3. The process of claim 1 wherein said alkaline aqueous reaction mixture is aged from about 0 hours to about 24 hours at a temperature from about ambient to about 120° C.

4. The process of claim 1 wherein the reaction conditions for crystallizing said zeolite from said alkaline aqueous reaction mixture include a temperature of from about 100° C. to about 200° C. and reaction time from about 5 hours to about 24 hours.

5. The process of claim 1 wherein the pH of said alkaline aqueous reaction mixture is from about 9 to about 13.

6. The process of claim 1 wherein the weight percent seeds, based on the amount of $SiO_2$ in the reaction mixture, is from about 0.2 to about 12%.

7. The process of claim 1 wherein the $SiO_2/Al_2O_3$ molar ratio in said reaction mixture is from about 30 to about 100.

* * * * *